United States Patent
Tiruchengode Tirumurugga Bupathi et al.

(10) Patent No.: US 12,160,169 B2
(45) Date of Patent: Dec. 3, 2024

(54) MULTIFUNCTION PIN FOR SOFT START AND CURRENT LIMIT IN VOLTAGE CONVERTERS

(71) Applicant: TEXAS INSTRUMENTS INCORPORATED, Dallas, TX (US)

(72) Inventors: Anandha Ruban Tiruchengode Tirumurugga Bupathi, Bangalore (IN); Suvadip Banerjee, Bangalore (IN); Anant Kamath, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 160 days.

(21) Appl. No.: 17/828,470

(22) Filed: May 31, 2022

(65) Prior Publication Data

US 2023/0291305 A1 Sep. 14, 2023

(30) Foreign Application Priority Data

Mar. 11, 2022 (IN) .............................. 202241013346

(51) Int. Cl.
*H02M 1/36* (2007.01)
*H02M 1/32* (2007.01)
*H02M 3/04* (2006.01)

(52) U.S. Cl.
CPC .............. *H02M 1/36* (2013.01); *H02M 1/32* (2013.01); *H02M 3/04* (2013.01)

(58) Field of Classification Search
CPC . H02M 1/32; H02M 1/36; H02M 3/04; G05F 3/26; G05F 3/262
See application file for complete search history.

(56) References Cited

U.S. PATENT DOCUMENTS

| | | | |
|---|---|---|---|
| 6,548,992 B1 * | 4/2003 | Alcantar ................. | H02M 1/32 363/49 |
| 7,420,791 B1 * | 9/2008 | Dong ............... | G01R 31/31721 361/90 |
| 2015/0162830 A1 * | 6/2015 | Dong ...................... | H02M 1/36 323/271 |

(Continued)

*Primary Examiner* — Gary L Laxton
(74) *Attorney, Agent, or Firm* — Valerie M. Davis; Frank D. Cimino (57) ABSTRACT

Circuits and systems include a parallel resistor-capacitor (RC) network coupled between a pin and ground, and first and second transistors coupled in source follower configuration with a common gate coupling. The source of the first transistor is coupled to the pin. A first switch couples a drain of the first transistor to the common gate coupling during soft-start (SS) and decouples that connection during over current limit (OCL) sensing, and a second switch couples a drain of the second transistor to the common gate coupling during OCL sensing and decouples that connection during SS. A first current source is enabled deliver a constant current to the pin during SS. A second current source is enabled to generate a reference voltage at the source of the second transistor during OCL, which reference voltage is transferred to the pin by the source follower configuration. A comparator controls the switches to transition from SS to OCL sensing. The comparator output signal is based on a comparison of the voltage at the pin to a threshold voltage.

23 Claims, 7 Drawing Sheets

(56) References Cited

U.S. PATENT DOCUMENTS

| | | | | |
|---|---|---|---|---|
| 2016/0147246 A1* | 5/2016 | Svorc | ........................ | G05F 3/26 |
| | | | | 323/315 |
| 2016/0172841 A1* | 6/2016 | Lee | ........................ | H02H 3/247 |
| | | | | 363/21.02 |
| 2016/0329807 A1* | 11/2016 | Daly | ........................ | H02M 1/32 |
| 2019/0260290 A1* | 8/2019 | Maejima | ................ | G01R 31/52 |
| 2021/0344339 A1* | 11/2021 | Boulestin | ............. | H03K 17/687 |

* cited by examiner

MULTIFUNCTION PIN FOR SOFT START AND CURRENT LIMIT IN VOLTAGE CONVERTERS

CROSS-REFERENCE TO RELATED APPLICATION

This application claims priority under 35 U.S.C. § 119 on Indian patent application 202241013346, filed Mar. 11, 2022. The content of this Indian patent application is incorporated by reference herein in its entirety.

FIELD OF DISCLOSURE

This disclosure relates to improvements in voltage converters, and more particularly to providing a single or multifunctional pin in a voltage converter (e.g., DC-DC converter) for soft start and over current limit functions.

BACKGROUND

DC-DC converters typically require programmable Soft-Start (SS) and Over Current Limit (OCL) functionalities. In a conventional DC-DC converter, two separate pins are provided, one for each function. During SS, the main field-effect transistor (FET) current ($I_{FET}$) is slowly ramped up from zero to a maximum current in a programmable time by using a proportional ramp voltage as a reference. This ramp voltage is generated by pumping a constant internal current into an external capacitor ($C_{EXT}$) until the voltage across it reaches a certain value. The time it takes to charge the external capacitor can be controlled (i.e., programmed) by selecting an appropriate capacitance value. The steady state OCL is programmed with an external resistor ($R_{EXT}$) after SS is complete.

In a prior approach, Both $C_{EXT}$ and $R_{EXT}$ are coupled in parallel between the same pin and ground and driven with the same constant current based on a bandgap voltage ($V_{BG}$) and a resistance value of an internal resistor of the circuit, during both an SS phase and an OCL phase. The voltage across the $R_{EXT}C_{EXT}$ circuit rises exponentially to a peak settling value, where the exponential rise portion of the curve represents the SS phase, and settled portion of the curve represents the OCL phase. The pin voltage ($V_{PIN}$) is compared against a voltage ($I_{FET}*R_{SNS}$) to turn on the FET through which $I_{FET}$ flows, where $R_{SNS}$ represents the resistance of a sensor resistor in the path of $I_{FET}$. The settling can be changed by changing the time constant $R_{EXT}C_{EXT}$. However, $C_{EXT}$ cannot be used independently for programming the settling time, because $R_{EXT}$ is determined based on the required OCL limit which is sensed by the final settled voltage. The DC accuracy depends on the product of the internal resistance and $R_{SNS}$, each of which can vary considerably.

In another prior approach, a separate pin is used for a biasing resistance, which essentially replaces the internal resistance. In this configuration, an external biasing resistor ($R_{BIAS}$) is coupled to a bias pin at which a voltage (VBIAS) is applied, with the other end of coupled to ground in common with the ground connections of $C_{EXT}$ and $R_{EXT}$. Here, the constant current used to drive the $R_{EXT}C_{EXT}$ circuit is a function of the value of VBIAS/$R_{BIAS}$. While this approach improves accuracy compared with the other prior approach described above, it does so at the expense of an additional pin.

In this context, aspects of this disclosure arise to provide a better solution to SS and OCL functions in voltage converters, e.g., DC-DC converters.

SUMMARY

In an example, a circuit comprises a first resistor (e.g., $R_{EXT}$) and a capacitor (e.g., $C_{EXT}$), each having one end coupled to a pin of the circuit and each having another end coupled to a common node (e.g., ground) to form a parallel resistor-capacitor (RC) network. The circuit further comprises first and second transistors, each having a first current terminal, a second current terminal, and a control terminal. The control terminals of the first and second transistors are coupled together to form a common control terminal, and the second terminal of the first transistor coupled to the pin. A first switch of the circuit is configured to couple the first current terminal of the first transistor to the common control terminal during soft-start (SS) of the circuit and to decouple the first current terminal of the first transistor from the common control terminal during over current limit (OCL) sensing of the circuit. A second switch of the circuit is configured to couple the first current terminal of the second transistor to the common control terminal during OCL sensing and to decouple the first current terminal of the second transistor from the common control terminal during SS. The circuit further comprises first and second current sources. The first current source is coupled to the first transistor and configured to deliver a constant current (e.g., $I_{INT}$) to the pin when enabled during SS. The second current source is coupled to the second transistor and configured to generate a reference voltage at the second current terminal of the second transistor when enabled during OCL sensing. A comparator of the circuit is configured to control the first and second switches to switch from SS to OCL sensing, the comparator output signal being based on a comparison of the voltage at the pin to a threshold voltage.

In an example, a circuit comprises a parallel resistance-capacitance (RC) network coupled between a pin of the circuit and ground; first and second transistors, each having a drain terminal, a source terminal, and a gate terminal, the gate terminals of the first and second transistors coupled together to form a common gate terminal, the source terminal of the first transistor coupled to the pin; current mirror circuitry configured to generate a first reference current (e.g., $I_{SS}$) for an SS operation based on a constant current that is at least five times the division of a threshold voltage ($V_{THRESH}$) and a minimum resistance of a resistor of the RC network and to generate a second reference current (e.g., $I_{REF\_OCL}$) for an OCL sensing operation; and switches to configure the circuit for the SS operation for a first period of time and to configure the circuit for the OCL sensing operation for a second period of time.

In an example, a method comprises performing an SS operation on a circuit, and then performing an OCL sensing operation on the circuit. The SS operation includes delivering a constant current (e.g., $I_{INT}$) to a pin of the circuit; charging a capacitor of a resistance-capacitance (RC) network of the circuit to increase a voltage at the pin up to a set voltage; and generating a first reference current (e.g., $I_{SS}$) for the SS operation. The OCL operation includes activating an internal current source to generate a reference voltage; and generating a second reference current (e.g., $I_{REF}$) for the OCL operation by sensing a resistance of a resistor of the RC network.

In an example, a system comprises a semiconductor chip having a circuit thereon and a pin coupled to the circuit and configured for external access, the circuit being configured to use the pin for performing both a soft-start (SS) operation and an over current limit (OCL) sensing operation on the system; and an external resistor and an external capacitor coupled in parallel between the pin and ground. The circuit comprises current mirror circuitry configured to generate a first reference current (e.g., $I_{SS}$) for the SS operation based on a constant current that is at least five times the division of a threshold voltage and a minimum resistance of the external resistor and to generate a second reference current (e.g., $I_{REF\_OCL}$) for the OCL sensing operation; and a plurality of switches to configure the circuit for the SS operation for a first period of time and to configure the circuit for the OCL sensing operation for a second period of time.

These and other features will be better understood from the following detailed description with reference to the accompanying drawings.

BRIEF DESCRIPTION OF THE DRAWINGS

Features of the disclosure may be understood from the following figures taken in conjunction with the detailed description.

The same reference numbers are used in the drawings to designate the same or similar (structurally and/or functionally) features.

DETAILED DESCRIPTION

Specific examples are described below in detail with reference to the accompanying figures. These examples are not intended to be limiting. In the drawings, corresponding numerals and symbols generally refer to corresponding parts unless otherwise indicated. The objects depicted in the drawings are not necessarily drawn to scale.

In example arrangements, during SS operation, a constant current is delivered to charge a capacitor of a resistor-capacitor (RC) network coupled between a pin and a common node, e.g., ground, where the amount of such constant current is sufficiently large to make the time period during which the SS operation is performed primarily dependent on the capacitance of the capacitor of the RC network and primarily independent of the resistance of the resistor of the RC network, enabling sensing of the capacitance. A current mirror and a source-follower transistor configuration is used to convert the voltage at the pin to a proportional reference current during SS operation, and following the SS operation, used to generate a reference voltage and transfer it to the pin to sense the resistance of the resistor of the RC network, during OCL operation. The source-follower transistor configuration is stable and independent of the capacitance of the capacitor of the RC network. A reference current for OCL sensing is based on the reference voltage and a resistance value of an external resistor. In an example, the constant current delivered during SS operation is more than five times the division of the threshold voltage and a minimum resistance of the resistor of the RC network. Such configurations advantageously enable integration of both SS and OCL sensing operations using the same circuit and a single pin, while achieving improved accuracy.

Figure 1A:
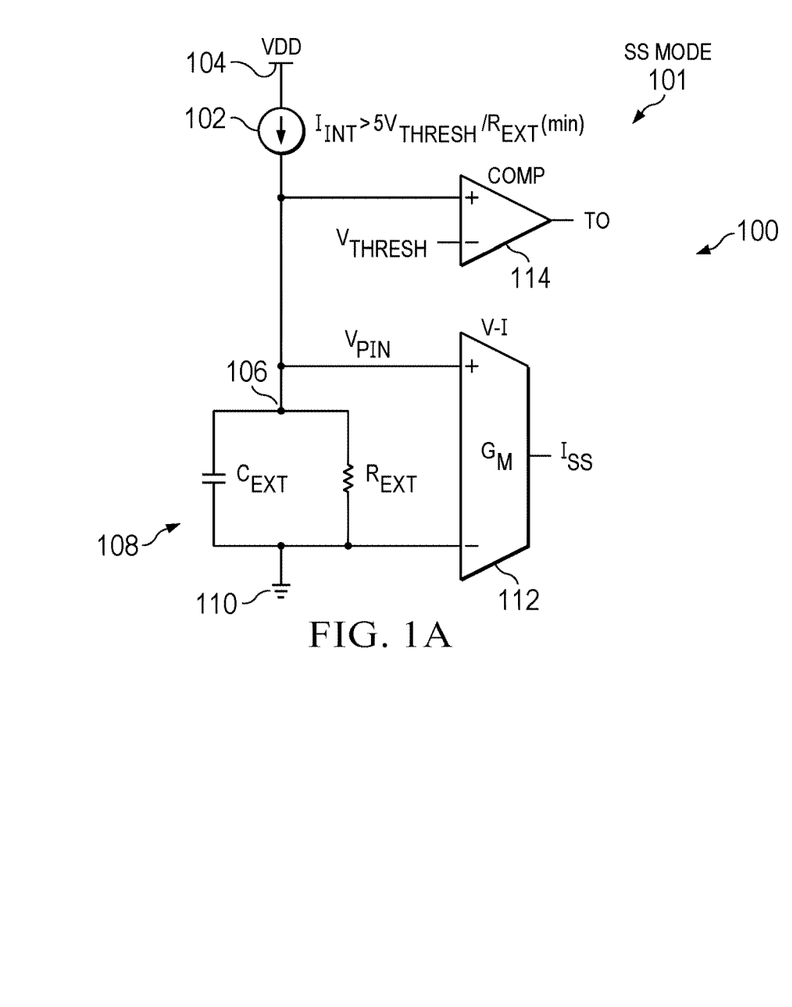
FIGS. 1A, 1B and 1C are diagrams illustrating use of a single pin (or node) of a voltage converter to perform both Soft-Start (SS) and Over Current Limit (OCL) sensing functions for the voltage converter.
Figure 1B:
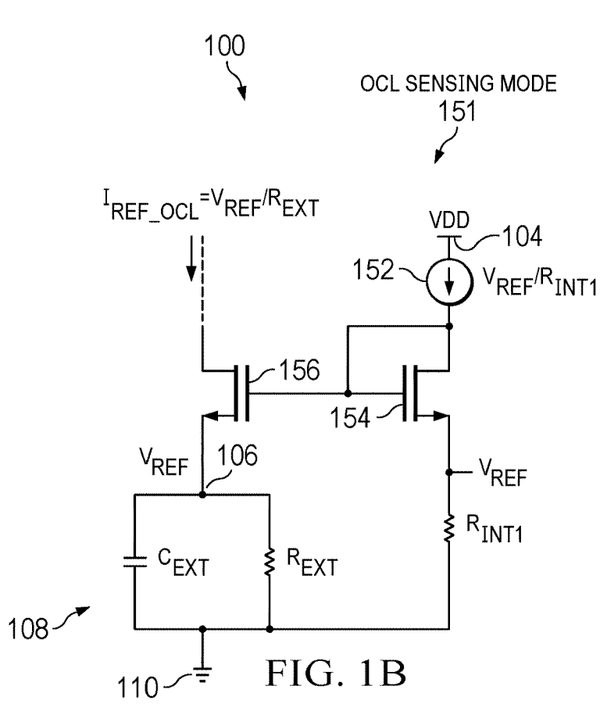
Figure 1C:
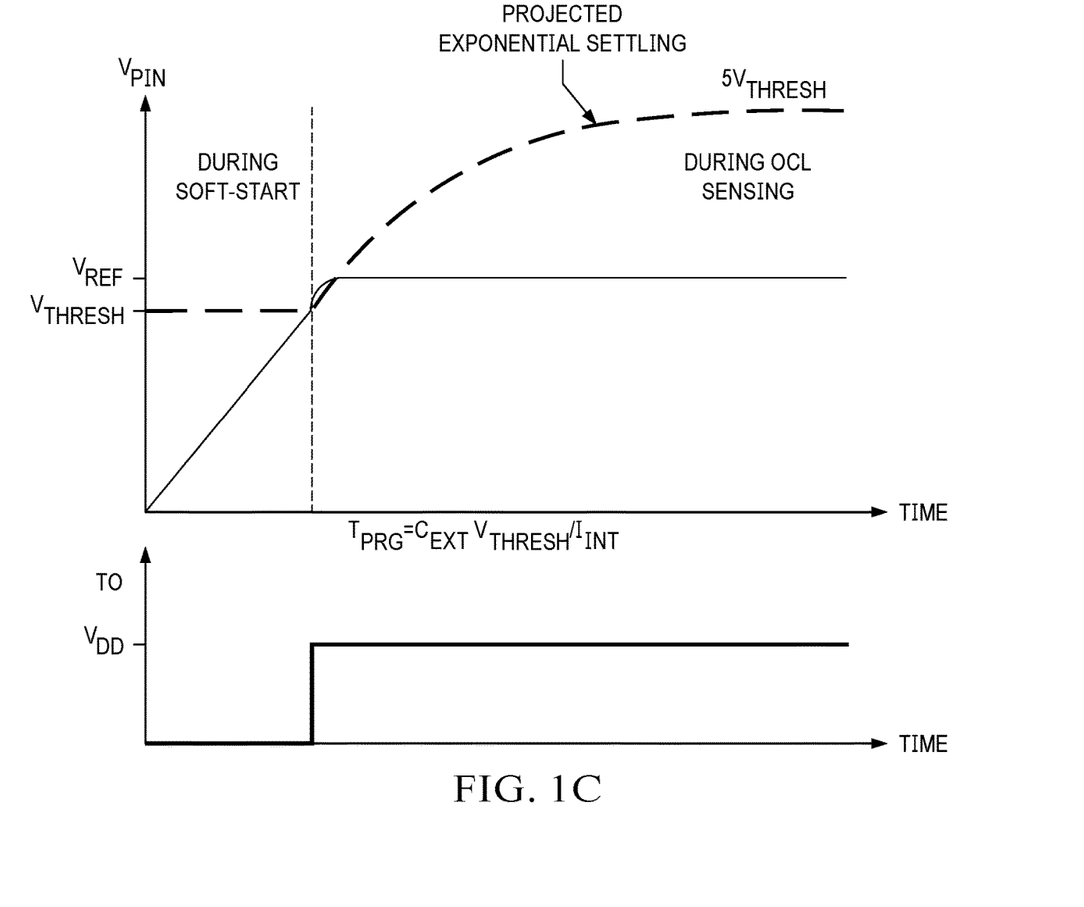

FIGS. 1A and 1B are diagrams illustrating the concept of using a single pin (or node) of a voltage converter to perform both Soft-Start (SS) and Over Current Limit (OCL) sensing operations for a voltage converter. FIG. 1A shows circuit 100 configured in SS mode (i.e., for SS operation), while FIG. 1B shows circuit 100 configured in OCL sensing mode (i.e., for OCL sensing operation). FIG. 1C are graphs of (i) a pin voltage ($V_{PIN}$) with respect to time, and (ii) the output (TO) of a comparator used to mark the transition from SS operation to OCL sensing operation with respect to time. During SS operation, capacitance of a capacitor of an RC network is sensed, and during OCL sensing operation, resistance of the resistor of the RC network is sensed.

Referring to FIG. 1A, SS-mode-configured circuit 101 includes a current source 102 coupled to a supply voltage terminal 104 that is configured to be coupled to a voltage supply (VDD). Current source 102 is configured to deliver a constant current ($I_{INT}$) to a pin 106 during SS operation. Circuit 101 also has a parallel resistor-capacitor (RC) network 108 coupled between pin 106 and ground 110. RC network 108 includes a capacitor $C_{EXT}$ and a resistor $R_{EXT}$, which are typically external to a chip or package embodying additional circuitry for performing the SS and OCL sensing operations, as well as other functions. During SS operation, $I_{INT}$ is delivered in a sufficiently large amount to make the time period during which the SS operation is performed (denoted $T_{PRG}$ in FIG. 1C), which operation includes the charging of $C_{EXT}$ and the sensing of its capacitance, primarily dependent on the capacitance value of $C_{EXT}$ and primarily independent of the resistance value of $R_{EXT}$. In an example, $I_{INT} > 5V_{THRESH}/R_{EXT}(min)$, where $V_{THRESH}$ represents a threshold voltage to which $V_{PIN}$ is compared during SS operation and $R_{EXT}(min)$ represents a minimum resistance value of $R_{EXT}$. $R_{EXT}(min)$ is set based on the maximum current limit supported for programming according to system design and/or specification. $V_{REF}$ is a reference voltage, which is slightly higher than $V_{THRESH}$ and the voltage at which $V_{PIN}$ settles. The dotted line extension of ramping $V_{PIN}$ is the projected exponential settling, which would be approximately $5V_{THRESH}$.

Circuit 101 implements a voltage-to-current (V-I) converter 112 to convert $V_{PIN}$ to a proportional current ($I_{SS}$) that is used as a reference current in the SS operation, where GM represents and the transconductance of V-I converter 112. During the SS operation, $V_{PIN}$ ramps up, and as it does, comparator 114 compares $V_{PIN}$ with $V_{THRESH}$. When $V_{PIN}$ exceeds $V_{THRESH}$, comparator 114 outputs a signal (TO), which is also shown in FIG. 1C. The TO signal indicates an end of the SS operation and the start of the OCL sensing operation and may also be used to turn off current source 102. The SS operation is defined by a program time ($T_{PRG}$), where $T_{PRG} \, C_{EXT} * V_{THRESH}/I_{INT}$.

Once the SS operation is complete (marked by TO assertion), circuit 100 is configured for OCL sensing operation. Referring to FIG. 1B, in OCL-sensing-mode-configured circuit 151, $V_{REF}$ is transferred to pin 106, using a source follower transistor configuration to generate a reference current ($I_{REF\_OCL}$) for the OCL sensing operation, which includes sensing the resistance of $R_{EXT}$. Current ($V_{REF}/R_{INT1}$ provided by an internal current source 152 that is turned on at the start of the OCL sensing operation, e.g., in response to assertion of the TO signal, flows into $R_{INT1}$, which is an internal resistor coupled between the source terminal of a transistor 154 and ground 110. Transistor 154 is coupled in a source follower configuration with a transistor 156, through which $I_{REF\_OCL}$ flows. The flow of current $V_{REF}/R_{INT1}$ generates reference voltage $V_{REF}$ at the source of transistor 154, and $V_{REF}$ is transferred to $V_{PIN}$ using transistor 156 as a source follower of transistor 154. In an example, each of transistors 154 and 156 is an n-type metal-oxide-semiconductor (NMOS) field-effect transistor. Pin 106 is coupled to, or part of, the source terminal of transistor 156. RC network 108 is coupled between pin 106 and ground 110.

Through the source follower action, $I_{REF\_OCL} \cong V_{REF}/R_{EXT}$, thus enabling the sensing of the resistance value of $R_{EXT}$. Also, as shown more clearly in the FET current limit circuit of FIG. 6, the current limit ($I_{FET}\_LIM$) is related to $I_{REF\_OCL}$ by the ratio of the resistances of two internal resistors: $R_{INT2}$ and $R_{SNS}$, where $R_{INT2}$ is used to convert $I_{REF\_OCL}$ to a voltage and $R_{SNS}$ is used to convert $I_{FET}$ to a voltage, which voltages are then compared. That is, $I_{FET}\_LIM\ I_{REF\_OCL}*(R_{INT2}/R_{SNS})$. The ratio of the resistances of $R_{INT2}$ and $R_{SNS}$ is process-independent; thus, process variation is approximately zero. Thus, the DC accuracy of circuit 100 may only be limited by $V_{REF}$ and $V_{GS}-V_T$ mismatch of transistors 154 and 156 in source follower configuration as a result of the difference between the resistance values of $R_{EXT}$ and $R_{INT1}$.

Figure 2A:
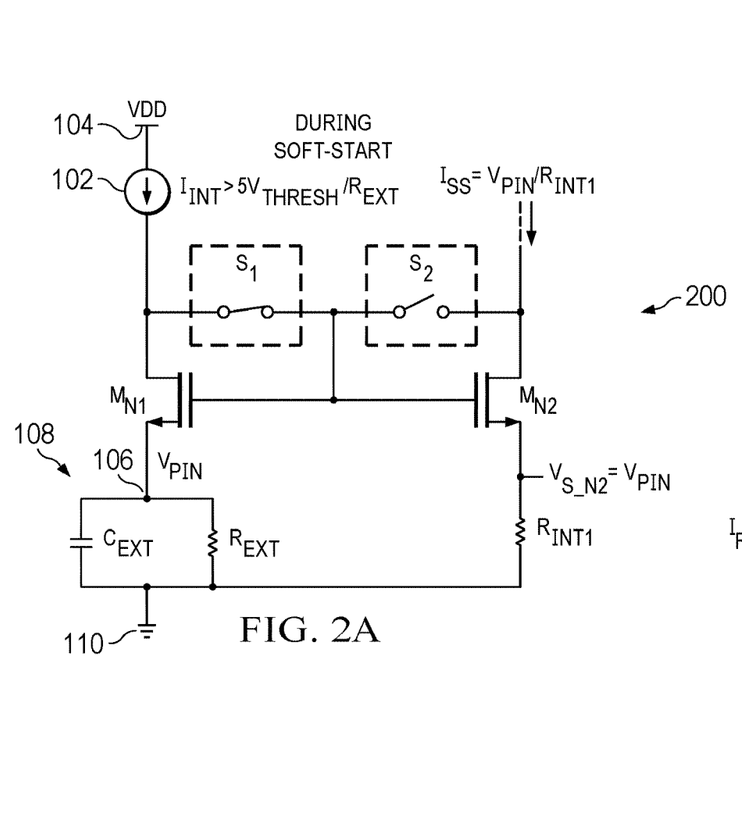
FIGS. 2A and 2B are circuit diagrams of an example circuit for performing both SS and OCL sensing functions for a voltage converter using a single pin, where the example circuit is configured for SS in FIG. 2A and configured for OCL sensing in FIG. 2B.
Figure 2B:
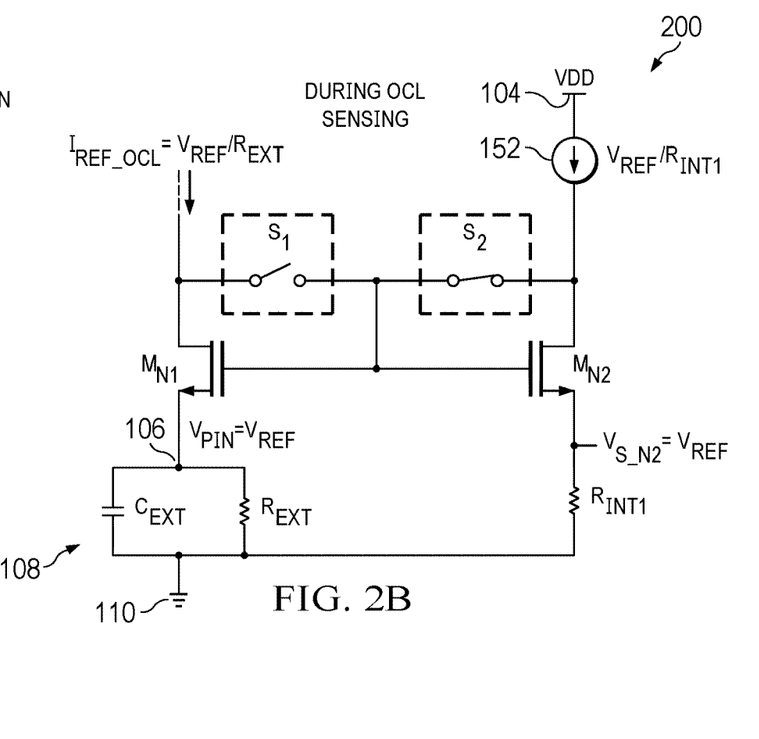

FIGS. 2A and 2B (collectively, FIG. 2) show an example circuit 200 configurable to perform both SS operation and OCL sensing operation. Similar to circuit 100 of FIGS. 1A and 1B, circuit 200 includes current sources 102 and 152, pin 106, $R_{INT1}$, RC network 108 that includes $R_{EXT}$ and $C_{EXT}$, as well as supply voltage and ground terminals 104 and 110, respectively. The source follower transistor configuration is included as well. In FIGS. 2A and 2B, this configuration includes NMOS transistors $M_{N1}$ and $M_{N2}$, and switches S1 and S2. Example circuit 200 is configured as follows.

During SS operation, current source 102 is actively coupled between supply voltage terminal 104 and the drain of $M_{N1}$, the source of which is coupled to pin 106. During OCL sensing operation, current source 152 is actively coupled between supply voltage terminal 104 and to the drain of $M_{N2}$, the source of which is coupled to $R_{INT1}$. The gates of $M_{N1}$ and $M_{N2}$ are commonly coupled. Switch S1 is configured to couple the drain and gate of $M_{N1}$ when closed, and switch S2 is configured to couple the drain and gate of $M_{N2}$ when closed. In an example, S1 is closed and S2 is open during SS operation, and S2 is closed and S1 is open during OCL sensing operation.

In SS operation, with S1 closed, S2 open, current source 102 enabled and current source 152 disabled, the drain of $M_{N1}$, the gate of $M_{N1}$ and the gate of $M_{N2}$ are coupled together, as shown in FIG. 2A, essentially providing the functionality of a voltage-to-current (V to I) converter. In response to generation of $I_{INT}$ by current source 102, $C_{EXT}$ is charged until $V_{PIN}$ reaches $V_{THRESH}$, which is slightly lower than $V_{REF}$, which is the approximate voltage at which $V_{PIN}$ settles. Ramping $V_{PIN}$ is converted to an SS reference current $I_{SS}$. During SS operation, the voltage at the source of $M_{N2}$ (Vs N2) follows $V_{PIN}$. Thus, $I_{SS} \cong V_{PIN}/R_{INT1}$. With this arrangement, the capacitance of $C_{EXT}$ may be sensed.

When $V_{PIN}$ reaches $V_{THRESH}$, S1 is opened, S2 is closed, current source 102 is disabled and current source 152 is enabled, providing the configuration of FIG. 2B. S1 and S2 may be set initially (e.g., for SS operation) and then controlled by the output of a comparator (e.g., the TO signal of FIG. 1). Current sources 102 and 152 may be likewise initially set and then controlled by the TO signal.

In FIG. 2B, when circuit 200 is configured as shown in FIG. 2B, current source 152 delivers a current ($V_{REF}/R_{INT1}$), and the reference voltage $V_{REF}$ that appears at the source of $M_{N2}$ (Vs N2) is transferred to pin 106 through the source follower configuration of $M_{N1}$ and $M_{N2}$. Thus, $V_{PIN} \cong V_{REF}$. This generates the reference current for the OCL sensing operation ($I_{OCL\_REF}$), which is approximately equal to $V_{REF}/R_{EXT}$, which enables sensing of the resistance of $R_{EXT}$.

Figure 3:
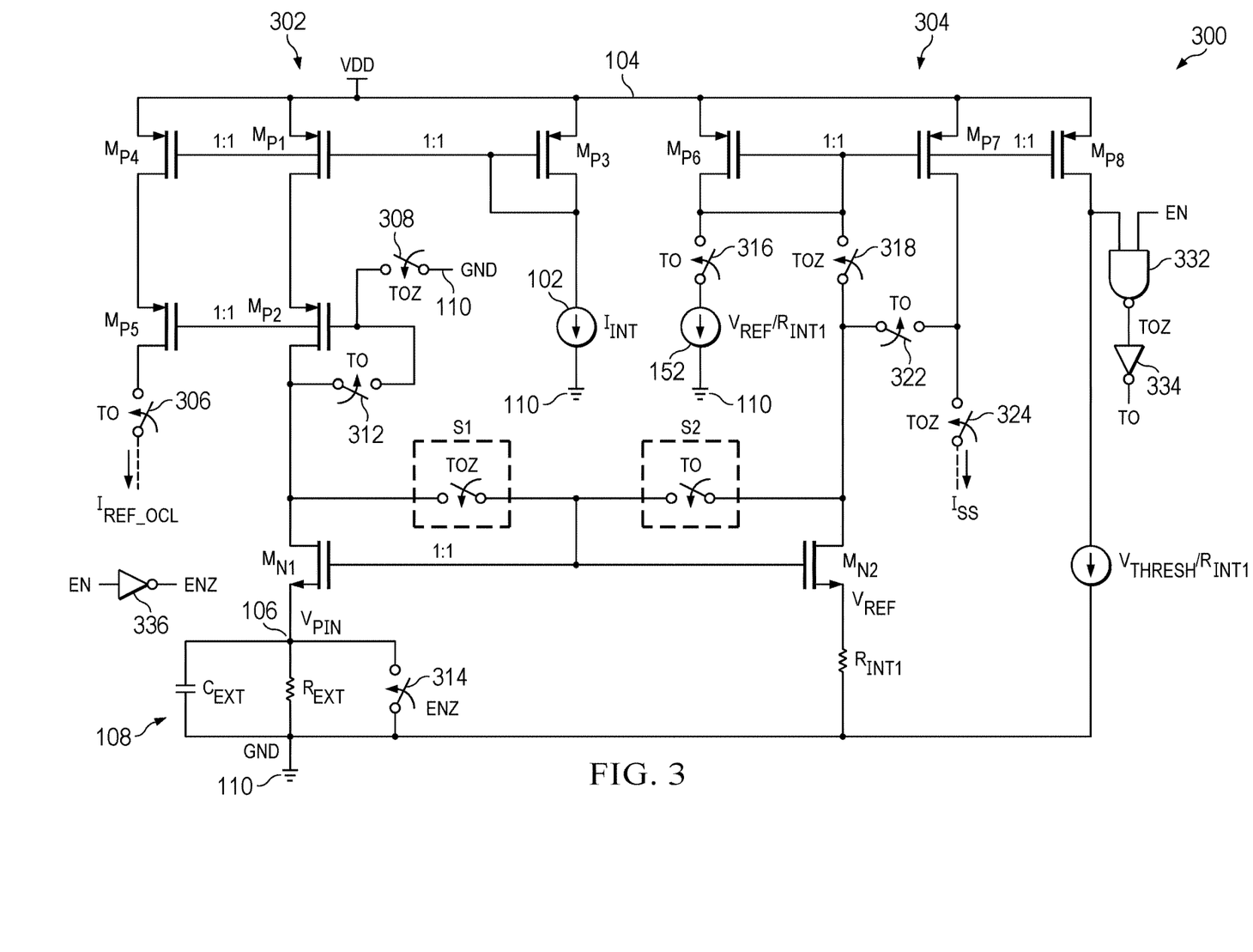
FIG. 3 is a circuit diagram of an example circuit configured to perform both SS and OCL functions using a single pin.

FIG. 3 is a circuit diagram of an example circuit 300 configured to perform both SS and OCL functions using a single pin. Circuit 300 includes current sources 102 and 152, pin 106, $R_{INT}$, RC network 108 that includes $R_{EXT}$ and $C_{EXT}$, as well as supply voltage and ground terminals 104 and 110, respectively. NMOS transistors $M_{N1}$ and $M_{N2}$ in source follower configuration, as well as switches S1 and S2, are also included. The comparator function and V-I conversion function are included with minor modifications.

Circuit 300 includes a first current mirror 304 used during SS operation and a second current mirror 302 used during OCL sensing operation. Collectively, first and second current mirrors may be considered current mirror circuitry.

First current mirror 304 includes p-type metal-oxide-semiconductor (PMOS) field-effect transistors $M_{P1}$, $M_{P2}$, $M_{P3}$, $M_{P4}$ and $M_{P5}$. $M_{P1}$, $M_{P3}$ and $M_{P4}$ are commonly coupled through their respective gates, and each of their sources is coupled to supply voltage terminal 104. The common gate coupling of $M_{P1}$, $M_{P3}$ and $M_{P4}$ is also coupled to the drain of $M_{P3}$, through which current flows via current source 102 during SS operation. The drain of $M_{P4}$ is coupled to the source of MPS, the drain of which forms a current path via switch 306 when closed during OCL sensing operation. Switch 306 is open during SS operation. The drain of $M_{P1}$ is coupled to the source of $M_{P2}$, the gate of which is coupled to the gate of $M_{P5}$. The gate of $M_{P2}$ is configured to be coupled to ground terminal 110 via switch 308 during SS operation or to its own drain via switch 312 during OCL sensing operation. Circuit 300 is configured such that, when switch 308 is open, switch 312 is closed, and vice versa.

The drain of $M_{N1}$ is coupled the drain of $M_{P2}$. Pin 106 is coupled to, or part of, the source of $M_{N1}$, and RC network 108 that includes parallel coupled $R_{EXT}$ and $C_{EXT}$ is coupled between pin 106 and ground terminal 110. In this example, a switch 314 is provided to short pin 106 to ground when an enable signal (EN) is low (and its complement signal ENZ is high); otherwise, switch 314 is open and does not affect RC network 108.

Second current mirror 302 includes PMOS transistors $M_{P6}$, $M_{P7}$ and $M_{P8}$, the respective gates of which are commonly coupled and also coupled to the drain of $M_{P6}$. The source of each of $M_{P6}$, $M_{P7}$ and $M_{P8}$ is coupled to supply voltage terminal 104. The drain of $M_{P6}$ (and common gate coupling of $M_{P6}$, $M_{P7}$ and $M_{P8}$) are coupled to current source 152 via switch 316 during OCL sensing operation when comparator output signal TO is high and are coupled to the drain of $M_{N2}$ during SS operation when TO is low (and its complement signal TOZ is high) via switch 318. The drain of $M_{P7}$ is coupled to the drain of $M_{N2}$ via switch 322 when TO is high, and when TO is low a path is formed via switch 324 for SS operation reference current $I_{SS}$.

The gate of $M_{N2}$ is coupled to the gate of $M_{N1}$, and S1 and S2 selectively couple that common gate connection to the drain of $M_{N1}$ and the drain of $M_{N2}$, respectively. $R_{INT}$ is coupled between the source of $M_{N2}$ and ground terminal 110.

A NAND gate 332 has an input coupled to the drain of $M_{P8}$ and another input configured to receive the enable signal (EN). The output of NAND gate 332 is coupled to the input of an inverter 334, which has an output for the TO signal. NAND gate 332 and inverter 334 operate in conjunction with $M_{P8}$ to form a comparator that is used to stop the SS operation and start the immediately-following OCL sensing operation. EN may be supplied by any suitable source, and its complement signal ENZ may be generated by an inverter 336 or other suitable circuitry.

When EN is low, TO is also low. Thus, all TOZ-actuated switches (i.e., switches S1, 308, 318 and 324) are closed, and $C_{EXT}$ is in the discharged state. On assertion of EN (e.g., EN high), the SS operation begins. $M_{N1}$ charges $C_{EXT}$, and $M_{N2}$ acts as a source follower and V-I converter. $M_{N2}$ generates a ramp current as $V_{PIN}/R_{INT1}$. $M_{P8}$ in conjunction with NAND gate 332 and inverter 334 function as comparator. The current of $M_{P8}$ is $V_{THRESH}/R_{INT1}$ when $V_{PIN}=V_{THRESH}$. Once the comparator output toggles, all TO-actuated switches (i.e., switches S2, 306, 312, 316 and 322) are closed, and all TOZ-actuated switches are opened, marking the end of the SS operation and the start of the OCL sensing operation. During the OCL sensing operation, $M_{N1}$ acts as a source follower to transfer $V_{REF}$ to pin 106, and $I_{REF\_OCL}$ is mirrored out at $M_{P5}$. The current through MP8 becomes $V_{REF}/R_{INT1}$, which is greater than $V_{THRESH}/R_{INT1}$ by design, since $V_{REF}>V_{THRESH}$. Thus, the comparator output remains high and stable. The state of circuit 300 is reset to low when EN is made low.

Figure 4:
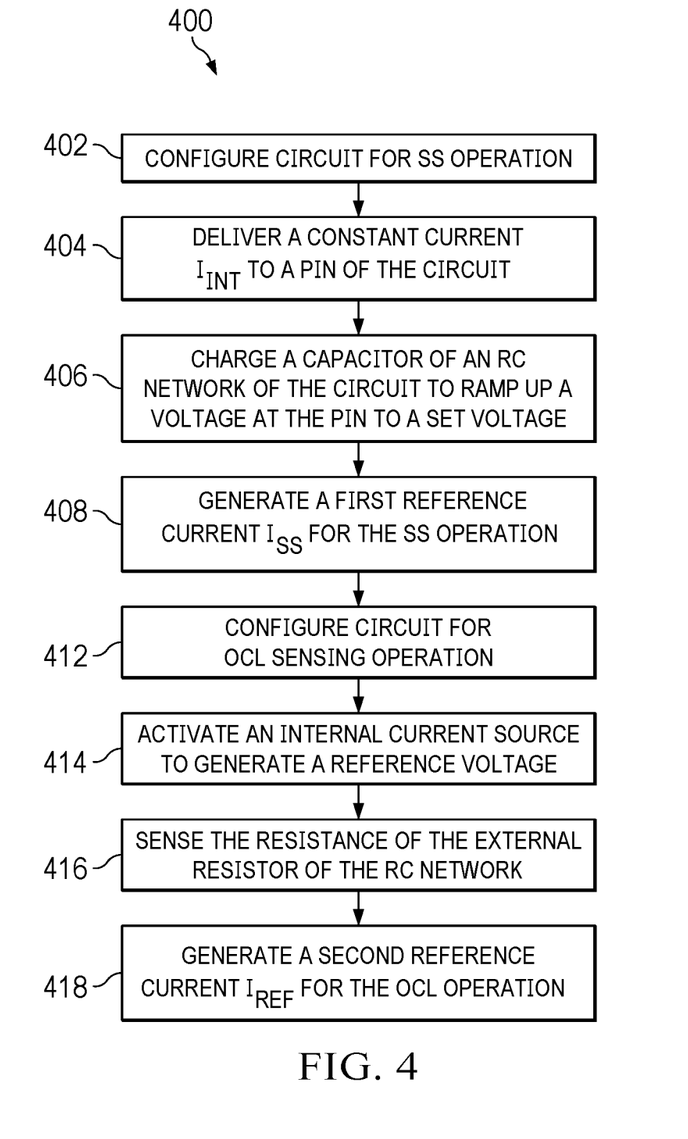
FIG. 4 is a flow diagram of an example of method of operating a circuit, e.g., a voltage converter to perform SS and OCL sensing operations.

FIG. 4 is a flow diagram of an example method 400 of performing an SS operation on a circuit (e.g., circuit 100, 200 and/or 300). Circuit 200 is used by way of example in describing method 400.

At operation 402, the circuit is configured in SS mode for SS operation. For example, switch S1 is closed and switch S2 is open; also, current source 102 is on and current source 152 is off. At operation 404, a constant current ($I_{INT}$) is delivered via current source 102 to a pin (or node) on circuit 200 that is used for both SS operation and OCL sensing operation, i.e., pin 106. In an example, $I_{INT}$ is more than five times threshold voltage ($V_{THRESH}$) divided by the resistance of $R_{EXT}$ that forms part of RC network 108 along with capacitor $C_{EXT}$. In operation 406, $C_{EXT}$ is charged to ramp up the voltage at pin 106 ($V_{PIN}$) to a set voltage (e.g., $V_{THRESH}$). In operation 408 a first reference current $I_{SS}$ for the SS operation is generated as $V_{PIN}/R_{INT1}$. In doing so, $V_{PIN}$ is transferred via transistors $M_{N1}$ and $M_{N2}$ in a source follower configuration to the source terminal of $M_{N2}$. Thus, $I_{SS}$ is proportional to $V_{PIN}$. From these relationships, the capacitance of $C_{EXT}$ may be sensed.

Once $V_{PIN}$ reaches $V_{THRESH}$, which may be determined via comparator 114 or other suitable circuitry, circuit 200 is reconfigured for OCL sensing operation. This reconfiguration (operation 412) may involve opening switch S1, closing switch S2, turning off current source 102, and turning on current source 152. With circuit 200 in OCL sensing mode, in operation 414 internal current source 152 is activated to generate a reference voltage ($V_{REF}$), where $V_{REF}$ is slightly higher than $V_{THRESH}$. $V_{REF}$ is transferred via transistors $M_{N1}$ and $M_{N2}$ in a source follower configuration to pin 106, such that $V_{PIN}$ follows $V_{REF}$, and as a result, the resistance of the external resistor is sensed in operation 416, and a reference current $I_{REF\_OCL}$ is generated for current limiting in operation 418. Thus, $I_{REF\_OCL}$ is approximately equal to $V_{REF}/R_{EXT}$.

FIG. 4 depicts one possible order of operations in performing an SS operation followed by an OCL sensing operation. Not all operations need necessarily be performed in the order described. Some operations may be combined into a single operation. One or more operations may be performed substantially simultaneously or in an overlapping manner. Additional operations and/or alternative operations may be performed.

For example, consistent with the description above, method 400 may include outputting a comparison signal indicating the end of the SS operation and the beginning of the OCL sensing operation. The comparison signal may be based on a comparison of $V_{PIN}$ to $V_{THRESH}$.

Figure 5:
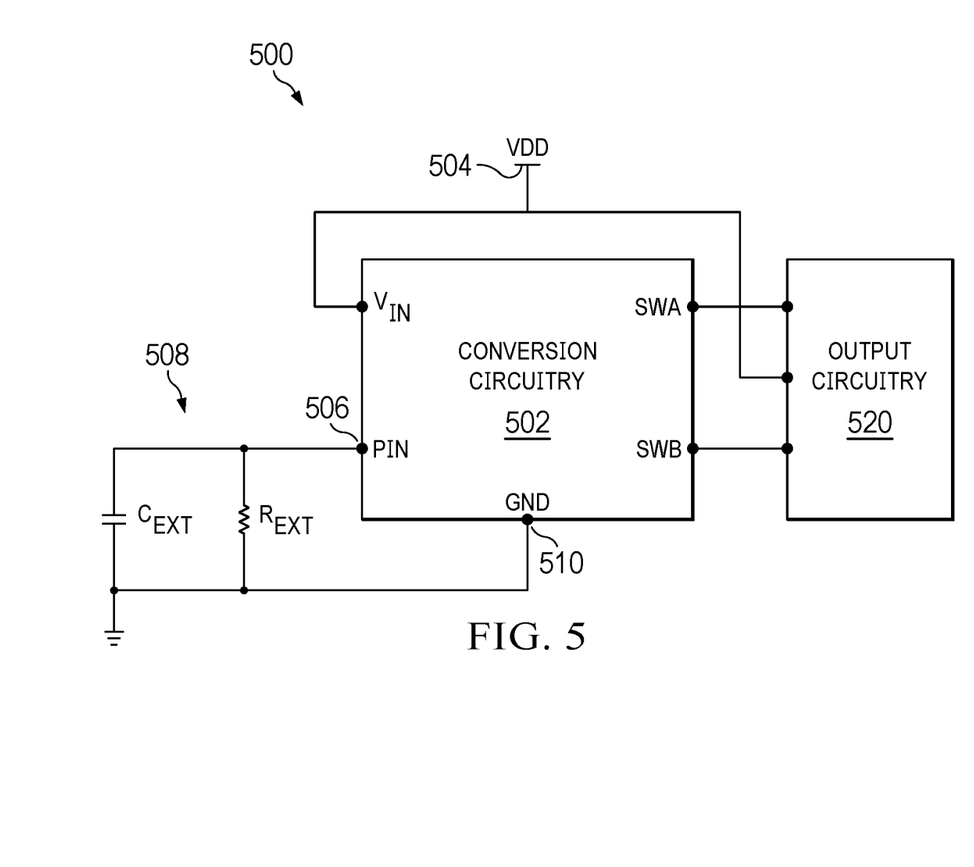
FIG. 5. is a diagram of an example system, e.g., a voltage converter, with circuitry for performing both SS and OCL sensing using a single pin.

FIG. 5 is a diagram of an example system 500, e.g., a DC-DC voltage converter, with circuitry for performing both SS and OCL sensing using a single pin. DC-DC voltage converter 500 may include conversion circuitry 502, which may be embodied on a semiconductor chip with external connections (or pins) including an input voltage (VIN) pin configured to be coupled to a supply voltage terminal 504, ground terminal 510, and pin 506 that is used for both SS operation and OCL sensing operation. RC network 508 including $R_{EXT}$ and $C_{EXT}$ is coupled between pin 506 and ground terminal 510. When conversion circuitry 502 is embodied on a semiconductor chip, RC network 508 may be external to the chip. Conversion circuitry 502 includes two output terminals, denoted SWA and SWB, which are configured to be coupled to output circuitry 520 which also has an input coupled to supply voltage terminal 504. A supply voltage (VDD) is coupled to supply voltage terminal 504 during operation. Output circuitry 520 may include a suitable transformer coupling, as well as other components, e.g., inductor(s) and capacitor(s), as is known in the art.

Figure 6:
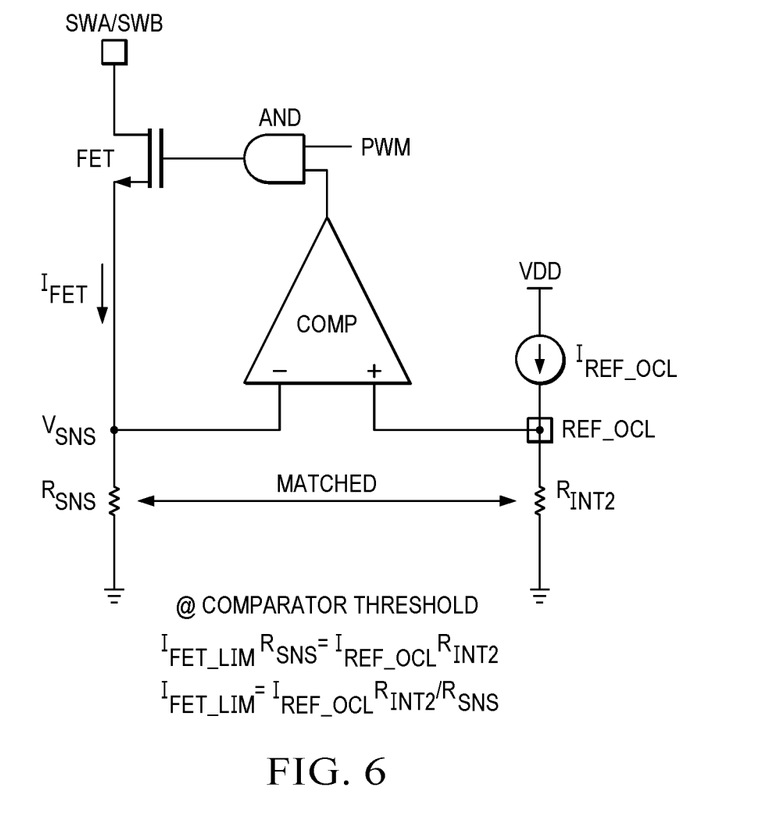
FIG. 6 is a circuit diagram of an FET limit circuit used to limit $I_{FET}$.

FIG. 6 shows an example FET limit circuit for use in limiting the current $I_{FET}$. The drain of the FET is coupled to an output (e.g., SWA or SWB) of DC-DC converter 500. The source of the FET is coupled to one end of the sensor resistor $R_{SNS}$, the other end of which is coupled to ground. Reference current $I_{REF\_OCL}$ is delivered to an internal node (REF_OCL node), which is coupled to one end of internal resistor $R_{INT2}$, the other end of which is coupled to ground. One input (e.g., the negative input) of a comparator is coupled to the source of the FET, where a voltage VSNS is generated, and the other input of the comparator is coupled to the REF_OCL node, where an internal voltage is generated. The output of the comparator is coupled to one input of an AND gate, the other input of which is configured to receive a pulse width modulated (PWM) signal. The FET limit circuit may also include a latch downstream of the AND gate to keep the FET in the off state for the remainder of the PWM cycle after the comparator is triggered, as is known in the art. When the comparator is triggered to assert a logic low signal, that causes the AND gate to assert a logic low signal, which turns off the FET, stopping the flow of $I_{FET}$. VSNS generated by $I_{FET}$ and $R_{SNS}$ is compared to the voltage at the REF_OCL node, which voltage is generated by $I_{REF\_OCL}$ and $R_{INT2}$. The limit of $I_{FET}$ ($I_{FET\_LIM}$) may be set based on the relationship between $I_{FET\_LIM}$ and $I_{REF\_OCL}$. That is, $I_{FET\_LIM} \cong I_{REF\_OCL} * (R_{INT2}/R_{SNS})$.

SS and OCL operations may be performed on DC-DC converter 500 using pin 106 for both operations, as described above.

Various examples of circuitry, systems and methods are provided in which a single pin or node is used for both SS and OCL sensing operations, thus easing design constraints of the chip to enable inclusion of a pin for other functionalities. In an RC network that may be external to the chip, capacitance and resistance are sensed independently. Delivering a large amount of current to charge the capacitor of the RC network during SS makes the time period during which SS is performed independent of the resistance of the resistor of the RC network. Using a source follower transistor configuration enables transfer of a reference voltage to the pin, enabling sensing of the resistance of the resistor of the RC network based on the reference voltage and the value of a reference current during OCL sensing. The reference current may be compared with the main FET current for current limiting. Internal resistances may be matched to simplify the procedure and minimize or eliminate process variations. The source follower transistor configuration is advantageously very stable and does not depend on the capacitance of the capacitor of the RC network. DC accuracy of the system, e.g., DC-DC converter, may be improved.

The term "couple" is used throughout the specification. The term and derivatives thereof may cover connections, communications, or signal paths that enable a functional relationship consistent with this description. For example, if device A provides a signal to control device B to perform an action, in a first example device A is coupled to device B, or in a second example device A is coupled to device B through intervening component C if intervening component C does not substantially alter the functional relationship between device A and device B such that device B is controlled by device A via the control signal provided by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the term "pin" means "terminal", "node", "interconnection", and/or "lead". Unless specifically stated to the contrary, these terms are generally used to mean an interconnection between or a terminus of a device element, a circuit element, an integrated circuit, a device or other electronic or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors and/or capacitors), and/or one or more sources (such as current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of CMOS fabrication technology is described herein, other fabrication technologies using other types of transistors (or equivalent devices) may be used instead. For example, instead of using p-type and n-type metal-oxide-silicon field-effect transistors (MOSFETs), other types of transistors, e.g., bipolar junction transistors (BJTs), or switching elements may be used instead.

Circuits described herein are reconfigurable to include the replaced components to provide functionality at least partially similar to functionality available prior to the component replacement. Components shown as delays, unless otherwise stated, are generally representative of one or more delay elements coupled in series and/or parallel to provide a specific amount of delay.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/−10 percent of the stated value.

Modifications of the described examples are possible, as are other examples, within the scope of the claims. Moreover, features described herein may be applied in other environments and applications consist with the teachings provided.

What is claimed is:

1. A circuit comprising:
   first and second transistors, each having a first terminal, a second terminal, and a control terminal, the control terminals of the first and second transistors coupled together to form a common control terminal, the second terminal of the first transistor coupled to a pin of the circuit;
   a first switch configured to couple the first terminal of the first transistor to the common control terminal during a first mode of the circuit and to decouple the first terminal of the first transistor from the common control terminal during a second mode of the circuit;
   a second switch configured to couple the first terminal of the second transistor to the common control terminal during the second mode and to decouple the first terminal of the second transistor from the common control terminal during the first mode;
   a first current source coupled to the first transistor and configured to deliver a current to the pin when enabled during the first mode; and
   a second current source coupled to the second transistor and configured to generate a reference voltage at the second terminal of the second transistor when enabled during the second mode.

2. The circuit of claim 1, further comprising:
   a first resistor and a capacitor, each having one end coupled to the pin of the circuit and each having another end coupled to a common node to form a parallel resistor-capacitor (RC) network;
   a comparator configured to control the first and second switches to switch from the first mode to the second mode, the comparator output signal being based on a comparison of a voltage at the pin to a threshold voltage, the first mode is soft start (SS) of the circuit and the second mode is over current limit (OCL) sensing of the circuit; and
   a second resistor coupled to the second terminal of the second transistor.

3. The circuit of claim 1, wherein the first terminal of each of the first and second transistors is a drain terminal and the second terminal of each of the first and second transistor is a source terminal.

4. The circuit of claim 1, wherein the constant current is at least five times the division of the threshold voltage and a minimum resistance of the resistor.

5. The circuit of claim 2, wherein the reference voltage generated by the second current source is used to sense a resistance of the first resistor during OCL sensing.

6. The circuit of claim 3, wherein, during SS, a voltage at the source terminal of the second transistor follows a voltage at the pin.

7. The circuit of claim 3, wherein, during OCL sensing, a voltage at the pin follows a voltage at the source terminal of the second transistor.

8. The circuit of claim 6, wherein, during SS, the second transistor functions as a source follower to generate a reference current for SS, which is based on the voltage at the pin and a resistance value of a second resistor coupled to the source terminal of the second transistor.

9. The circuit of claim 7, wherein, during OCL sensing, the first transistor functions as a source follower to generate a reference current for OCL sensing, which is based on the voltage at the source terminal of the second transistor and a resistance value of the first resistor.

10. A circuit comprising:
first and second transistors, each having a drain terminal, a source terminal, and a gate terminal, the gate terminals of the first and second transistors coupled together to form a common gate terminal, the source terminal of the first transistor coupled to a pin of the circuit;
current mirror circuitry configured to generate a first reference current (Iss) for a soft-start (SS) operation and to generate a second reference current (IREF_OCL) for an over current limit (OCL) sensing operation; and
switches to configure the circuit for the SS operation for a first period of time and to configure the circuit for the OCL sensing operation for a second period of time.

11. The circuit of claim 10, further comprising:
a parallel resistance-capacitance (RC) network coupled between the pin of the circuit and ground;
a resistor coupled between the drain terminal of the second transistor and ground.

12. The circuit of claim 10, further comprising:
comparison circuitry coupled to the current mirror circuitry, the comparison circuitry configured to detect a transition from the SS operation to the OCL sensing operation.

13. A method comprising:
performing a soft-start (SS) operation on a circuit including:
delivering a constant current to a pin of the circuit;
charging a capacitor of a resistance-capacitance (RC) network of the circuit to increase a voltage at the pin up to a set voltage; and
generating a first reference current for the SS operation; and
performing an over current limit (OCL) sensing operation on the circuit after performing the SS operation, the OCL sensing operation including:
activating an internal current source to generate a reference voltage; and
generating a second reference current for the OCL operation by sensing a resistance of a resistor of the RC network.

14. The method of claim 13, wherein the constant current delivered to the pin of the circuit during the SS operation is at least five times the quotient of a threshold voltage and the resistance of the resistor of the RC network.

15. The method of claim 14, further comprising:
outputting a comparison signal indicating an end of the SS operation and a beginning of the OCL sensing operation, the comparison signal being based on a comparison of the voltage at the pin to a threshold voltage.

16. The method of claim 15, wherein the comparison signal is outputted at an end of a program time period that is a function of a capacitance of the capacitor of the RC network, the threshold voltage and the constant current delivered during the SS operation.

17. The method of claim 13, wherein the generating of the first reference current for the SS operation includes transferring the voltage at the pin to a node in a current path of the first reference current.

18. The method of claim 13, wherein the activating of the internal current source to generate the reference voltage for the OCL operation includes transferring the reference voltage to the pin.

19. A system comprising:
a semiconductor chip having a circuit thereon and a pin coupled to the circuit and configured for external access, the circuit being configured to use the pin for performing both a soft-start (SS) operation and an over current limit (OCL) sensing operation on the system;
an external resistor and an external capacitor coupled in parallel between the pin and ground;
wherein the circuit comprises:
current mirror circuitry configured to generate a first reference current for the SS operation and to generate a second reference current for the OCL sensing operation; and
a plurality of switches to configure the circuit for the SS operation for a first period of time and to configure the circuit for the OCL sensing operation for a second period of time.

20. The system of claim 19, wherein the circuit further comprises:
first and second transistors, each having a drain terminal, a source terminal, and a gate terminal, the gate terminals of the first and second transistors coupled together to form a common gate terminal, the source terminal of the first transistor coupled to the pin.

21. The system of claim 20, wherein a first switch of the plurality of switches is configured to couple the drain and gate terminals of the first transistor during the SS operation, and a second switch of the plurality of switches is configured to couple the drain and gate terminals of the second transistor during the OCL sensing operation.

22. The system of claim 19, wherein the first period of time is based on a capacitance of the external capacitor and substantially independent of a resistance of the external resistor.

23. The system of claim 19, wherein the system comprises a DC-DC converter.

* * * * *